United States Patent
Bui et al.

(10) Patent No.: US 8,054,569 B2
(45) Date of Patent: Nov. 8, 2011

(54) METHOD AND APPARATUS TO IDENTIFY A DATA BAND ENCODED BETWEEN TWO SERVO BANDS IN A SEQUENTIAL INFORMATION STORAGE MEDIUM

(75) Inventors: Nhan Xuan Bui, Tucson, AZ (US); Reed Alan Hancock, Tucson, AZ (US); Shuhei Nadehara, Yamato (JP); Eiji Ogura, Yamato (JP); Kazuhiro Tsuruta, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 12/505,442

(22) Filed: Jul. 17, 2009

(65) Prior Publication Data

US 2011/0013307 A1 Jan. 20, 2011

(51) Int. Cl.
*G11B 5/09* (2006.01)
*G11B 5/584* (2006.01)

(52) U.S. Cl. ................. 360/51; 360/48; 360/77.12

(58) Field of Classification Search .......... None
See application file for complete search history.

(56) References Cited

U.S. PATENT DOCUMENTS

| | | | |
|---|---|---|---|
| 5,457,581 A * | 10/1995 | Hallamasek | 360/51 |
| 6,937,413 B2 | 8/2005 | Bui et al. | |
| 7,106,544 B2 | 9/2006 | Dugas et al. | |
| 7,245,450 B1 | 7/2007 | Cherubini et al. | |
| 7,365,929 B2 | 4/2008 | Cherubini et al. | |
| 7,724,466 B2 * | 5/2010 | Bui et al. | 360/77.12 |
| 2004/0223248 A1 | 11/2004 | Dugas et al. | |

* cited by examiner

*Primary Examiner* — Daniell L Negron
(74) *Attorney, Agent, or Firm* — Dale F. Regelman; Quarles & Brady LLP (57) ABSTRACT

A method and apparatus is presented to determine a lateral position of a read/write head relative to a sequential information storage medium having a servo signal encoded therein and moving adjacent to the read/write head, where the servo signal comprises a plurality of pulses. The method includes detecting the servo signal using the read/write head and calculating a timing interval between each of the pulses using a clock rate of a clock signal. The clock rate is then adjusted based upon the velocity of the sequential information storage medium.

20 Claims, 9 Drawing Sheets

METHOD AND APPARATUS TO IDENTIFY A DATA BAND ENCODED BETWEEN TWO SERVO BANDS IN A SEQUENTIAL INFORMATION STORAGE MEDIUM

FIELD OF THE INVENTION

The present invention relates generally to a data storage apparatus, and more particularly to an apparatus and method to identify a data band encoded between two servo bands in a sequential information storage medium.

BACKGROUND OF THE INVENTION

Tape drives move a flexible magnetic tape from one tape spool to another across a read/write head capable of either reading data from or writing data to the tape. The tape drive itself, in operation, is connected to a host computer which either sends information to the tape drive to be written on the tape or receives information that is being read from the tape. Typically, efforts are made to match the data rates of the host and the tape drive. For example, the data rate of the tape drive is affected by basic operations, such as changing data tracks and adjusting read/write head alignment. Furthermore, the data rate of the host is often an aggregate rate that is a function of hardware, such as communication links.

SUMMARY OF THE INVENTION

In one implementation, a method is presented to identify a data band encoded between two servo bands in a sequential information storage medium and moving at a velocity across a read/write head comprising two servo elements and a read/write element. The method detects a beginning of a first servo band, detects a beginning of a second servo band, measures the velocity, adjusts the clock rate based upon the measured velocity, calculates an offset between the first servo band and the second servo band, and identifies the data band using the offset.

In another implementation, an article of manufacture is presented having a computer readable medium including computer readable program code disposed therein to identify a data band encoded between two servo bands in a sequential information storage medium and moving at a velocity across a read/write head comprising two servo elements and a read/write element. The computer readable program coded includes a series of computer readable program steps to effect detecting a beginning of a first servo band, detecting a beginning of a second servo band, measuring the velocity, adjusting the clock rate based upon the measured velocity, calculating an offset between the first servo band and the second servo band, and identifying the data band using the offset.

In yet another implementation, computer program product is presented encoded in a computer readable medium and useable with a programmable computer processor to identify a data band encoded between two servo bands in a sequential information storage medium and moving at a velocity across a read/write head comprising two servo elements and a read/write element. The computer program product includes computer readable program code which causes said programmable processor to detect a beginning of a first servo band, detect a beginning of a second servo band, measure the velocity, adjust the clock rate based upon the measured velocity, calculate an offset between the first servo band and the second servo band, and identify the data band using the offset.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
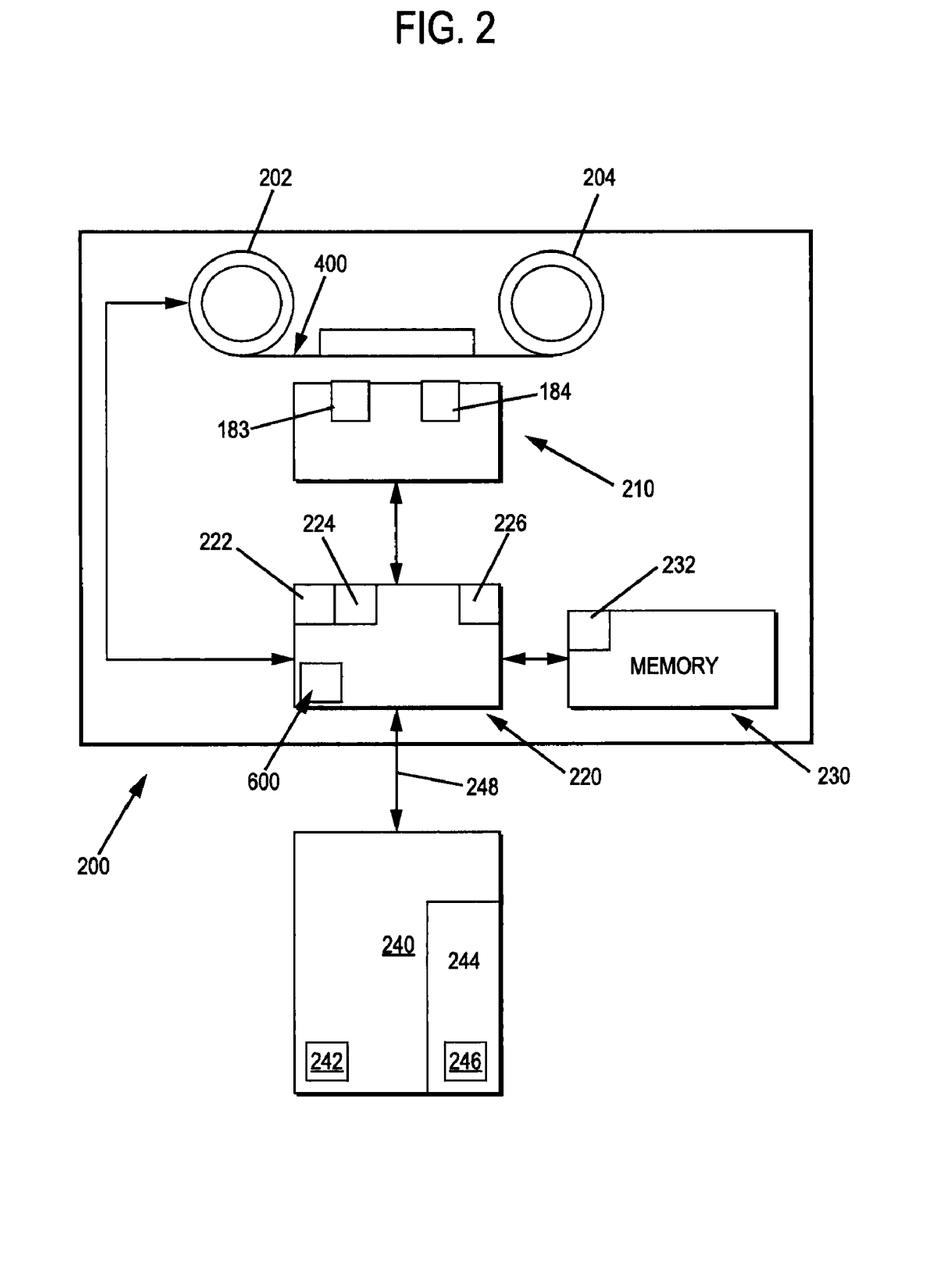
FIG. 2 is a block diagram illustrating an exemplary embodiment of Applicants' data storage apparatus.

Referring now to FIG. 2, when writing data to, or reading data from, a sequential information storage medium 400 (FIGS. 2, 4A, 4B), such as a magnetic tape, a portion of the medium is disposed on a first rotatable reel, such as reel 202, and a portion of the medium is disposed on a second rotatable reel, such as reel 204. The rotatable reels are moved such that sequential information storage medium 400 is moved from one reel, across read/write head 210, and onto the other reel. Read/write head 210 comprises write element 183. Write element 183 encodes information in sequential information storage medium 400 in sequential information storage medium 400. Read/write head 210 further comprises read element 184. Read element 184 detects information encoded in sequential information storage medium. Read element 184 provides detected signals to a read channel 600 (FIG. 6) for further processing. In certain embodiments, a read element and a write element are disposed in an integral assembly. As those skilled in the art will appreciate, read/write head 210 may comprise other elements and components not shown in FIG. 2.

In the illustrated embodiment of FIG. 2, read/write head 210 is in communication with controller 220. In certain embodiments, controller 220 is integral with read/write head 210. Further in the illustrated embodiment of FIG. 2, controller comprises processor 222 and data buffer 224. Controller 220 is in communication with computer readable medium 230. Instructions 232 are encoded in computer readable medium 230.

In certain embodiments, computer readable medium 230 is integral with controller 220. In the illustrated embodiment of FIG. 2, reel 202, reel 204, read/write head 210, controller 220, and computer readable medium 230 are disposed within a data storage apparatus 200. As those skilled in the art will appreciate, data storage apparatus 200 may comprise other elements and components not shown in FIG. 2.

Figure 1:
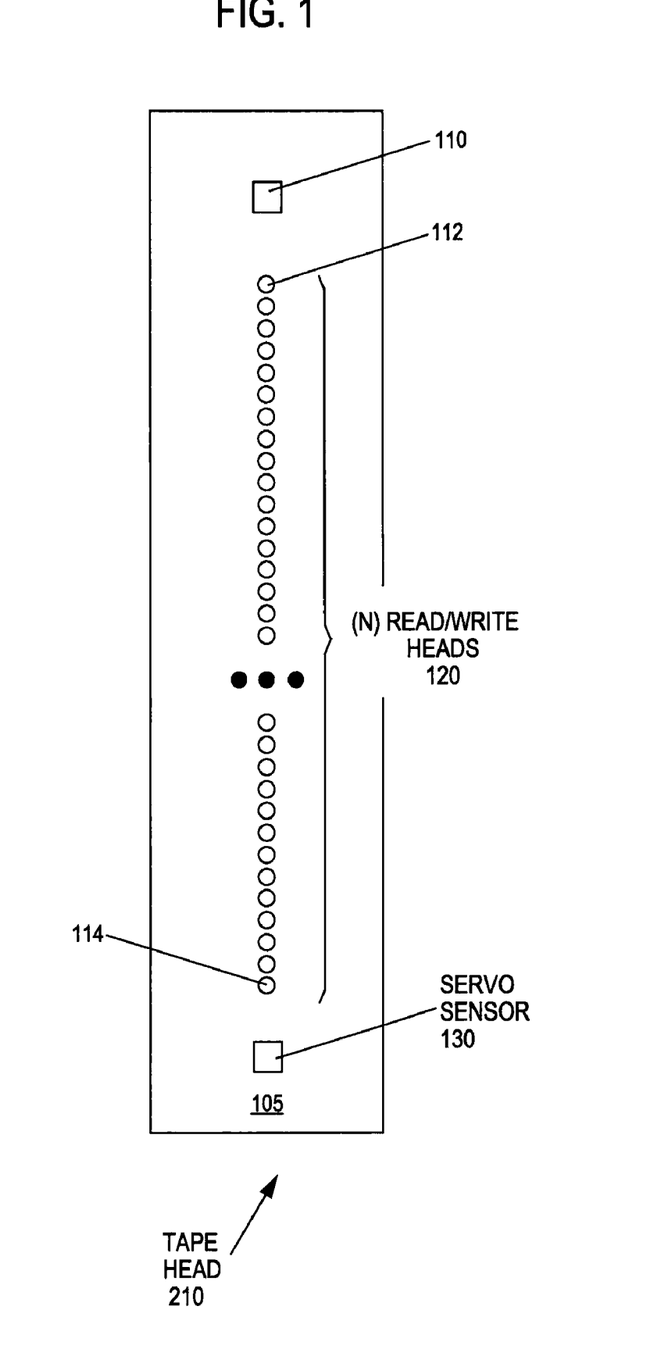
FIG. 1 is a perspective view of an exemplary embodiment of Applicants' read/write head.
Figure 4A:
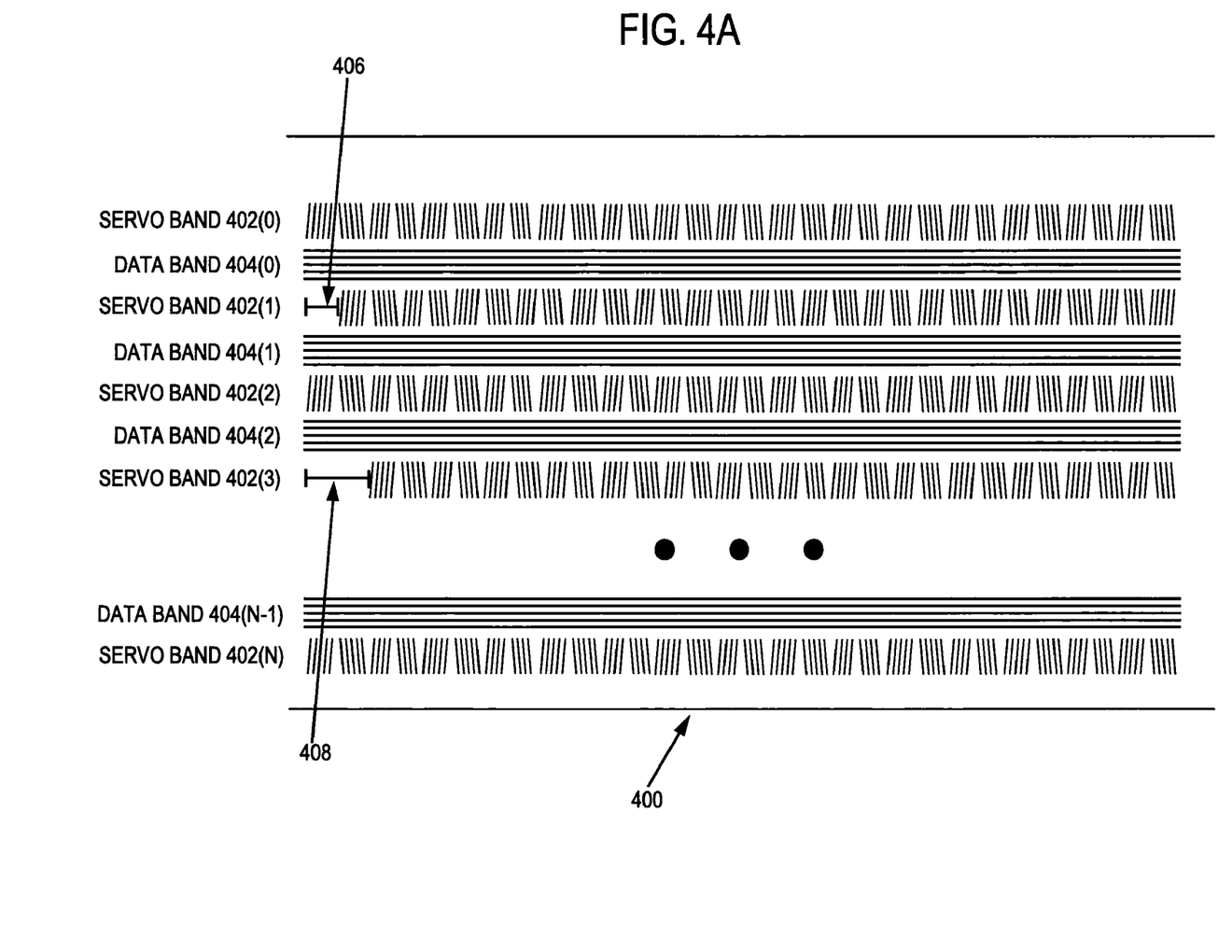
FIG. 4A is a block diagram illustrating an exemplary embodiment of the architecture of a sequential information storage medium.
Figure 4B:
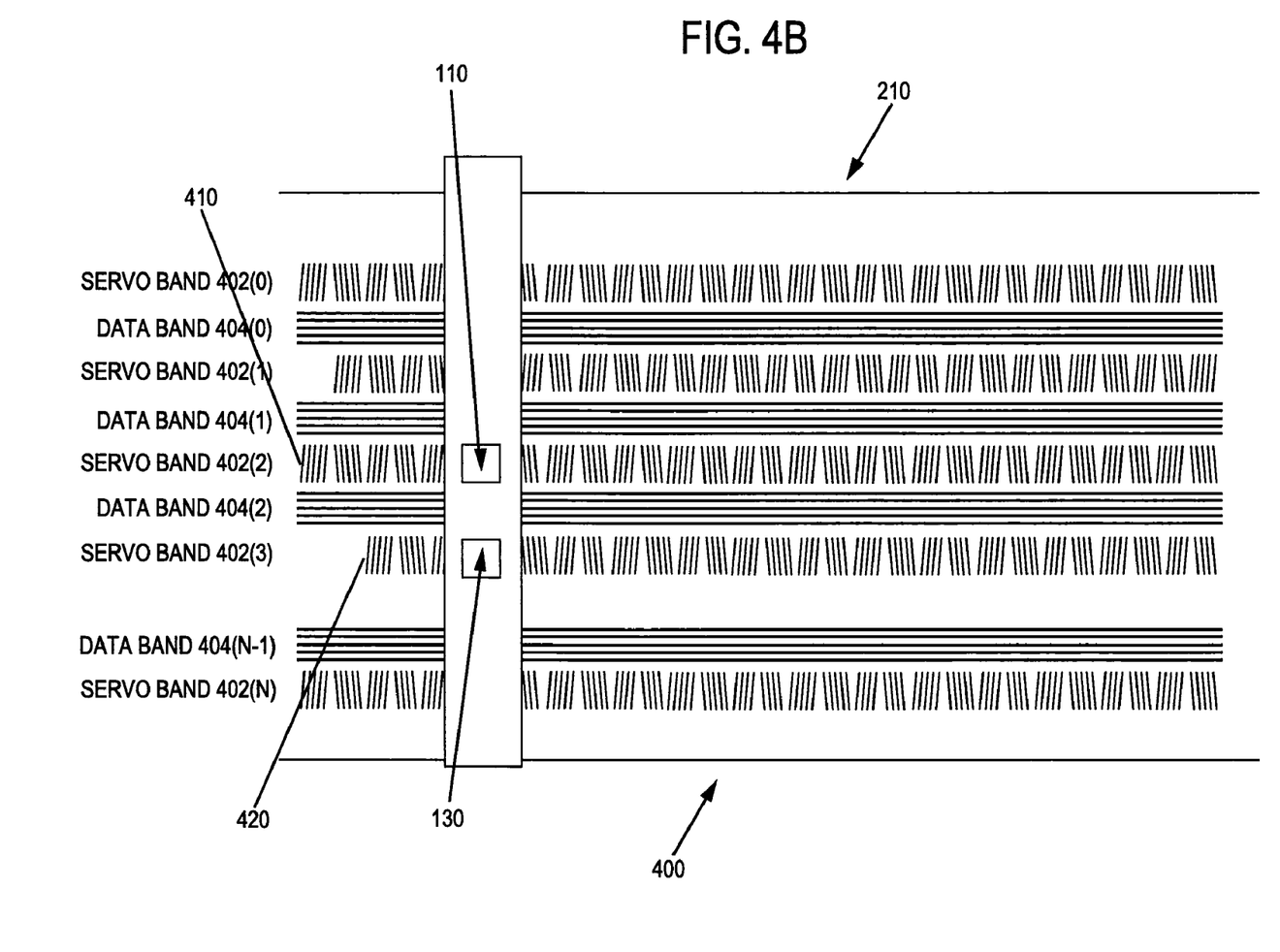
FIG. 4B is a block diagram illustrating a read/write head spanning an exemplary sequential information storage medium.

FIG. 1 illustrates surface 105 of read/write head 210 (FIGS. 1, 2), wherein surface 105 faces sequential information storage medium 400 (FIGS. 2, 4A, 4B). In the illustrated embodiment of FIG. 1, surface 105 comprises (N) read/write elements 120 disposed between servo sensors 110 and 130. In certain (N) is selected from the group consisting of 8, 16, 32, and 64.

In sequential data storage media, such as for example magnetic tape storage media, servo patterns are encoded in non-data portions of the medium. Those servo patterns are used to position a read/write head with respect to a plurality of data tracks, to provide sync data, to provide manufacturer data, and to determine longitudinal position ("LPOS") along the length of the medium.

Figure 3:
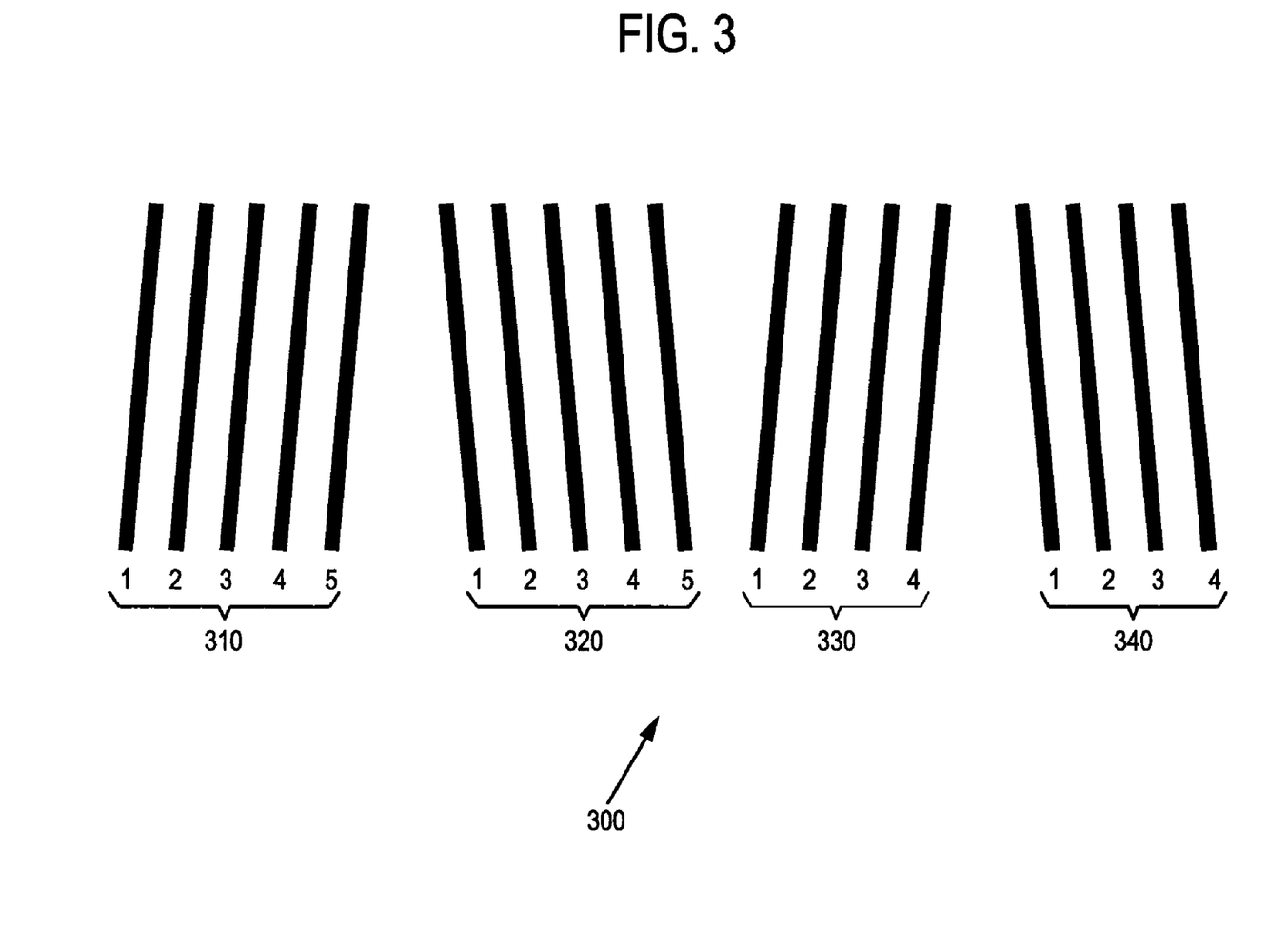
FIG. 3 shows a servo pattern comprising four bursts, wherein each of those four bursts comprises a plurality of pulses.

Referring to FIG. 3, servo pattern 300 consists of transitions with two different azimuthal slopes. Read/write head lateral position with respect to a moving sequential information storage medium is derived from the relative timing of pulses detected by a servo element detecting servo pattern 300 (FIG. 3), or a variation thereof.

Servo pattern 300 comprises a first burst 310 comprising five pulses, wherein each of those five pulses comprises a first azimuthal slope. Servo pattern 300 further comprises a second burst 320 comprising five pulses, wherein each of those five pulses comprises a second azimuthal slope. Servo pattern 300 further comprises a third burst 330 comprising four pulses, wherein each of those four pulses comprises the first azimuthal slope. Servo pattern 300 further comprises a fourth burst 340 comprising four pulses, wherein each of those four pulses comprises the second azimuthal slope.

Figure 6:
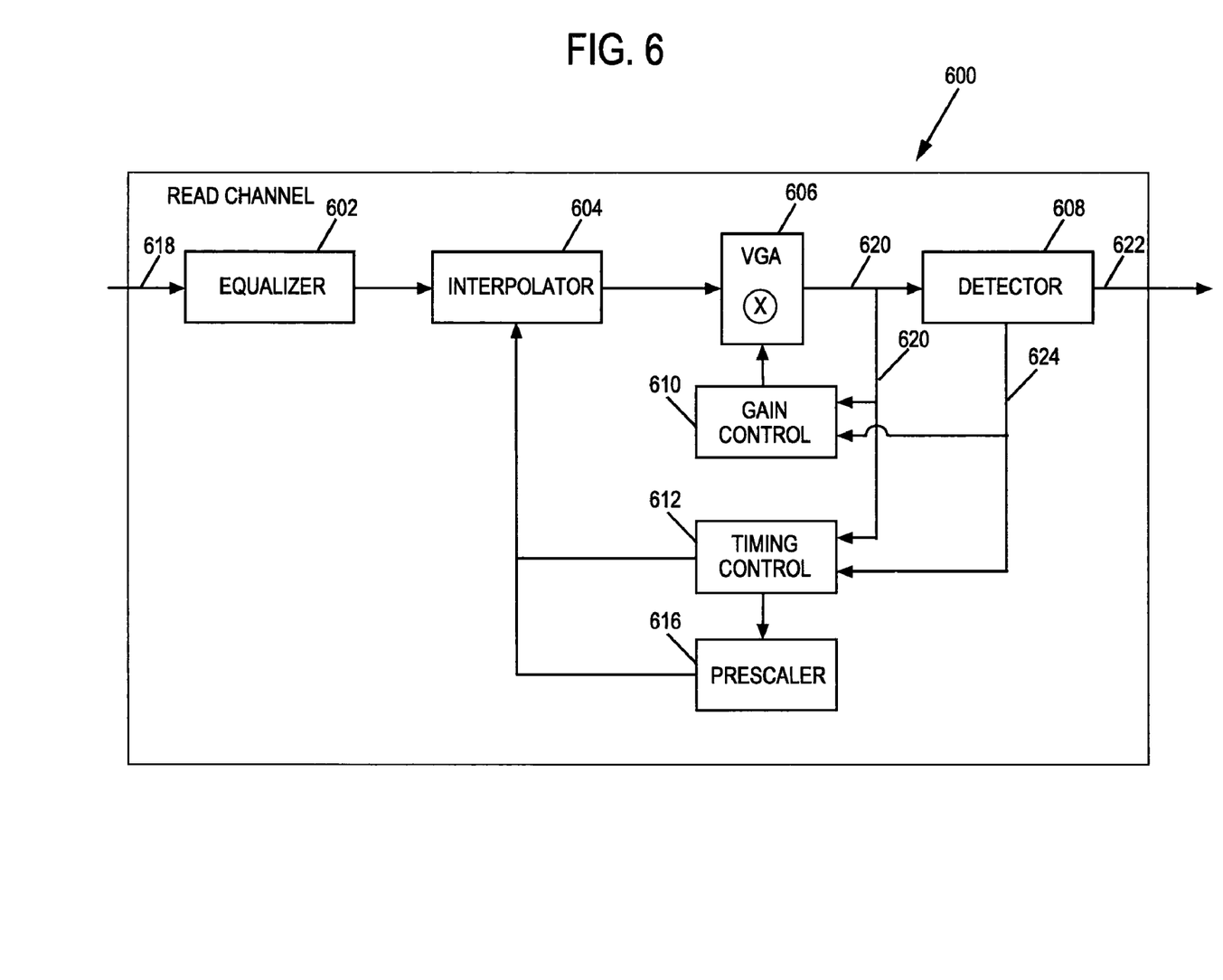
FIG. 6 is a block diagram of an exemplary read channel.

FIG. 6 illustrates an embodiment of a portion of Applicants' read channel 600. In certain embodiments, where a read/write head comprises multiple read channels, some of the components of the read channels may be shared.

In the illustrated embodiment of FIG. 6, read channel 600 includes equalizer 602, interpolator 604, variable gain amplifier (VGA) circuit 606, detector 608, gain control 610, timing control 612, and prescaler 616. As those skilled in the art will appreciate, Applicants' read channel 600 comprises additional elements, or other topologies, not shown in FIG. 6.

Determination of the information content of the signals detected by a read element requires determining a likely timing or position of a plurality of encoded signals. In certain embodiments, sample signals, such as signal 618, are taken asynchronously with respect to a clock used to write the data on the sequential information storage medium. Interpolator 604 interpolates the asynchronous samples into a set of samples that can be considered to be synchronous with a write clock used when encoding the sequential information storage medium. In certain embodiments, timing control component 612 includes phase-error generation logic, a phase locked loop (PLL), and phase interpolation logic to derive a reference for interpolator 604 to provide the synchronous samples. The determined data information which is represented by a stream of detected bits (i.e., zeros and ones) is outputted as signal 622 for further processing.

Applicants' read channel 600 comprises a timing control function 612 which is used to decode signals detected in a sequential information storage medium. Applicants' invention comprises a method, making use of that timing control function, to adjust a clock rate used by a counter, such as counter 226 (FIG. 2), based on a velocity of the sequential information storage medium. Applicants' method further identifies a data band based upon certain offset distances determined from detecting one or more servo bands.

Figures 7, 7A:
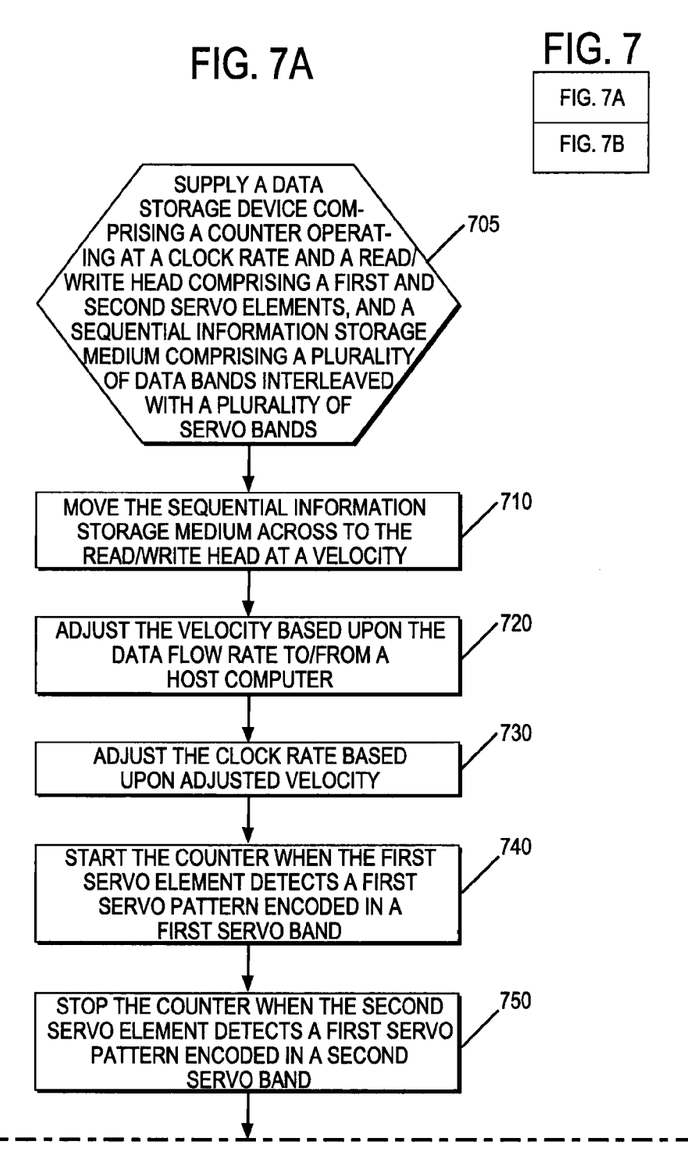
FIG. 7A is a flowchart of an exemplary method of calculating a timing interval.
Figure 7B:
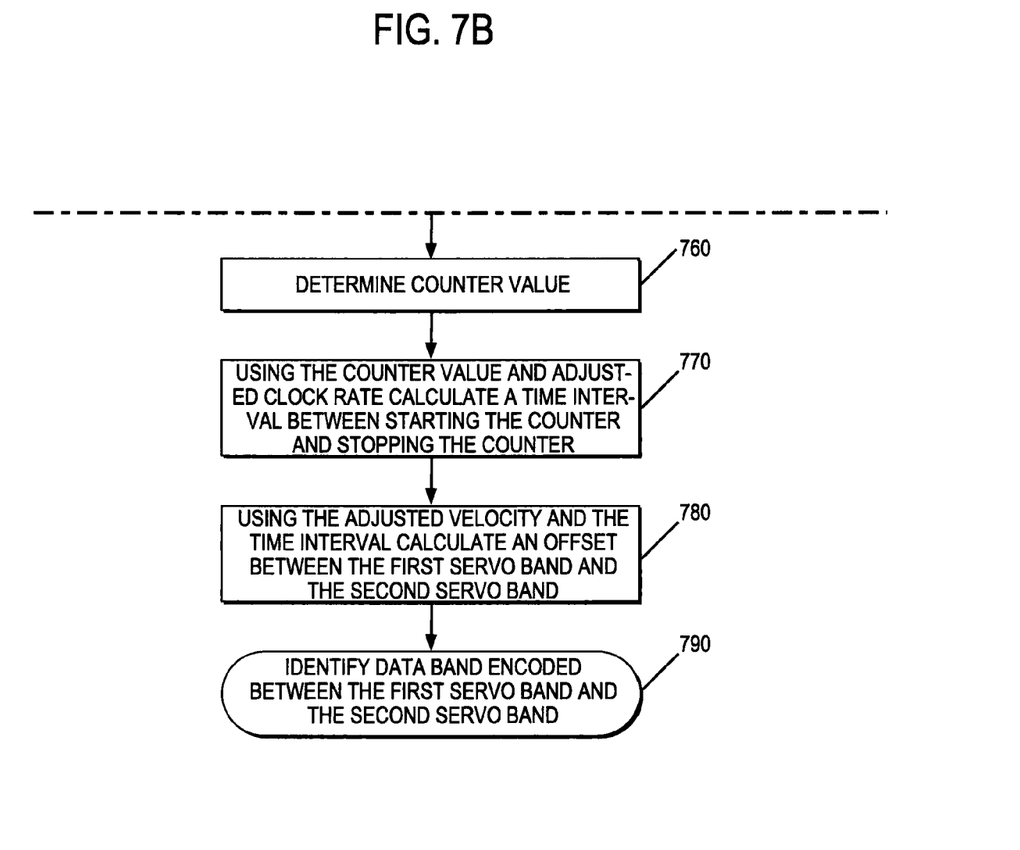
FIG. 7B is a flowchart of additional methods of calculating a timing interval.

FIGS. 7A and 7B summarizes Applicants' method. Referring now to FIG. 7A, in step 705 the method provides a data storage apparatus comprising a read/write head comprising a first and second servo element, such as read/write head 210, and a counter operating at a clock rate, such as counter 226, in combination with a sequential information storage medium comprising a plurality of data bands interleaved with a plurality of servo bands.

Turning to FIG. 4A, sequential information storage medium 400 is comprises (N) data bands 404 interleaved with (N+1) servo bands 402. In certain embodiments, (N) is 5. In certain embodiments, (N) is greater than 5. In certain embodiments, (N) is less than 5. In certain embodiments, servo bands 402 are narrower than data bands 404.

In the illustrated embodiment of FIG. 4B, read/write head 210 is positioned such that servo element 110 can detect servo band 402(2), and such that servo element 130 can detect servo band 402(3). In certain embodiments, sequential information storage medium 400 comprises a first servo band and a second servo band with (N) data bands encoded between the first and second servo bands. In other embodiments, a plurality of servo bands may be encoded in sequential information storage medium 400, such as by way of example and not limitation, after every third data band or every fifth data band.

Increasing the number of servo bands encoded in a sequential information storage medium necessarily reduces the storage capacity if the storage medium. On the other hand, the reduction of data storage space resulting from increasing the number of servo bands is offset by enhanced data integrity. In addition, increasing the number of servo bands increases the robustness of read/write head positioning by encoding reference servo bands adjacent to individual data bands.

As depicted in the illustrated embodiments of FIGS. 4A and 4B, a location of a first servo pattern in each servo band 402 is offset with respect to the s first servo pattern encoded in adjacent servo bands, as illustrated by offsets 406 and 408. The length of a servo band offset with respect to adjacent servo bands comprises a unique identifier for a data band encoded between the two servo bands. Thus, for example, data band 404(2) can be identified by offset 408 between the servo patterns of servo bands 402(2) and 402(3). Data band 404(1) can be identified by offset 406 between servo bands 402(1) and 402(2), where offsets 406 and 408 differ.

In certain embodiments, the first servo pattern of servo band 402(1) is offset by 33 microns as compared to the first servo pattern encoded in servo bands 402(0) and 402(2). The first servo pattern of servo band 402(3) is offset by a distance of 66 microns as compared to the first servo pattern encoded in servo band 402(2).

Returning to FIG. 7A, in step 710 the sequential information storage medium is moved across a read/write head at a velocity. In step 720, the velocity of step 710 is adjusted based upon a data flow rate to and/or from a host computer to the data storage apparatus of step 705. In certain embodiments, step 720 is performed by a controller, such as controller 220 disposed in a data storage device, such as data storage apparatus 200. In certain embodiments, step 720 is performed by a processor, such as processor 242, disposed in a host computer, such as host computer 240, where that host computer is in communication with a data storage device.

In step 730, the method adjusts the clock rate of step 705 based upon the adjusted velocity of step 720. The data storage apparatus of step 705, such as data storage apparatus 200 (FIG. 2), is in communication with a host computer, such as for example host computer 240 (FIG. 2). The host computer sends data to be written to, and receives data read from, a sequential information storage medium, such as sequential information storage medium 400 (FIGS. 2, 4A, 4B) via communication link 248 at a data flow rate. In certain embodiments, the data flow rate is an aggregate rate that is a function of the host bandwidth as well communication link bandwidth.

The velocity at which a sequential information storage medium, such as sequential information storage medium 400, is caused to move across a read/write head, such as read/write head 210 (FIGS. 1, 2, and 4B), may be increased or decreased as the data flow rate increases or decreases. As described hereinabove, data storage apparatus 200 comprises a counter 226 and a read channel 600, wherein that read channel comprising a timing control element 612 (FIG. 6). In certain embodiments, that timing control element comprises a fixed clock frequency in Hertz.

Table 1 recites a Resolution value of counts per micron using a counter comprising a clock rate of 1.5 E+07 Hertz for various sequential information storage medium velocities. As described hereinabove, Applicants' method offsets adjacent servo bands encoded in a sequential information storage medium by, for example and without limitation, 33 microns or 66 microns. Referring to TABLE 1, when data storage apparatus 200 (FIG. 2) moves a sequential information storage medium at 1 meter per second, the counter would increment 15 times for each micron the medium travels. For an offset distance of 33 microns, the counter value would equal about 500. A counter value for a 66 micron offset would equal about 1000.

TABLE 1

| Velocity (m/s) | Clock (Hz) | Distance (m) | Count | Resolution (count/um) |
|---|---|---|---|---|
| 1 | 1.50E+07 | 3.30E−05 | 495 | 15 |
| 2 | 1.50E+07 | 3.30E−05 | 248 | 7.5 |
| 3 | 1.50E+07 | 3.30E−05 | 165 | 5 |
| 4 | 1.50E+07 | 3.30E−05 | 124 | 3.75 |
| 5 | 1.50E+07 | 3.30E−05 | 99 | 3 |
| 6 | 1.50E+07 | 3.30E−05 | 83 | 2.5 |

In contrast, when data storage apparatus 200 (FIG. 2) moves a sequential information storage medium at 6 meters per second, the counter would increment only 2.5 times for each micron the medium travels, resulting in a poor measurement resolution.

To resolve the counter measurement resolution problem described above, Applicants' method in step 730 adjusts the counter clock rate based upon the adjusted sequential information storage medium velocity of step 720. In certain embodiments, step 730 is performed by a controller, such as controller 220 disposed in a data storage device, such as data storage apparatus 200. In certain embodiments, step 730 is performed by a processor, such as processor 242, disposed in a host computer, such as host computer 240, where that host computer is in communication with a data storage device. In certain embodiments, step 730 is performed by a prescaler, such as prescaler 616 (FIG. 6).

TABLE 2 recites a clock rate which is adjusted based upon the velocity of the moving storage medium, such that a constant Resolution in counts per micron is achieved. For example, when data storage apparatus 200 (FIG. 2) moves a sequential information storage medium at 1 meter per second, Applicants' apparatus and method sets a clock rate for Applicants' counter 226 at 1.50E+07 Hertz. When data storage apparatus 200 (FIG. 2) moves a sequential information storage medium at 6 meters per second, however, Applicants' apparatus and method sets a clock rate for Applicants' counter 226 at 9.00E+07 Hertz.

TABLE 2

| Velocity (m/s) | Clock (Hz) | Distance (m) | Count | Resolution (count/um) |
|---|---|---|---|---|
| 1 | 1.50E+07 | 3.30E−05 | 495 | 15 |
| 2 | 3.00E+07 | 3.30E−05 | 495 | 15 |
| 3 | 4.50E+07 | 3.30E−05 | 495 | 15 |
| 4 | 6.00E+07 | 3.30E−05 | 495 | 15 |
| 5 | 7.50E+07 | 3.30E−05 | 495 | 15 |
| 6 | 9.00E+07 | 3.30E−05 | 495 | 15 |

As illustrated in table 2, as the velocity of sequential information storage medium 400 increases, the counter clock rate proportionally increases. As a result, the resolution is unchanged and, thus, the resolution for data band identification and skew measurement remains constant.

In step 740, the method starts Applicants' counter when a first servo element detects a first servo pattern encoded in a first servo band. By way of example and not limitation, in the illustrated embodiment of FIG. 4B, counter 226 (FIG. 2) is started when servo element 210 detects pulse 410 encoded in servo band 402(2). In certain embodiments, step 706 is performed by a controller, such as controller 220 disposed in a data storage device, such as data storage apparatus 200. In certain embodiments, step 706 is performed by a processor, such as processor 242, disposed in a host computer, such as host computer 240, where that host computer is in communication with a data storage device.

In certain embodiments, step 740 is performed by a controller, such as controller 220 disposed in a data storage device, such as data storage apparatus 200. In certain embodiments, step 740 is performed by a processor, such as processor 242, disposed in a host computer, such as host computer 240, where that host computer is in communication with a data storage device. In certain embodiments, step 740 is performed by a prescaler, such as prescaler 616 (FIG. 6).

In step 750, the method stops the counter started in step 740 when a second servo element detects a first servo pattern of the second servo band, where the first and second servo bands are separated by a data band. By way of example and not limitation, in the illustrated embodiment of FIG. 4B, counter 226 is stopped when servo element 220 detects pulse 420 encoded in servo band 402(3).

In certain embodiments, the counter 226 comprises timing control 612. In certain embodiments, counter 226 is external to but in communication with timing control 612.

Figure 5:
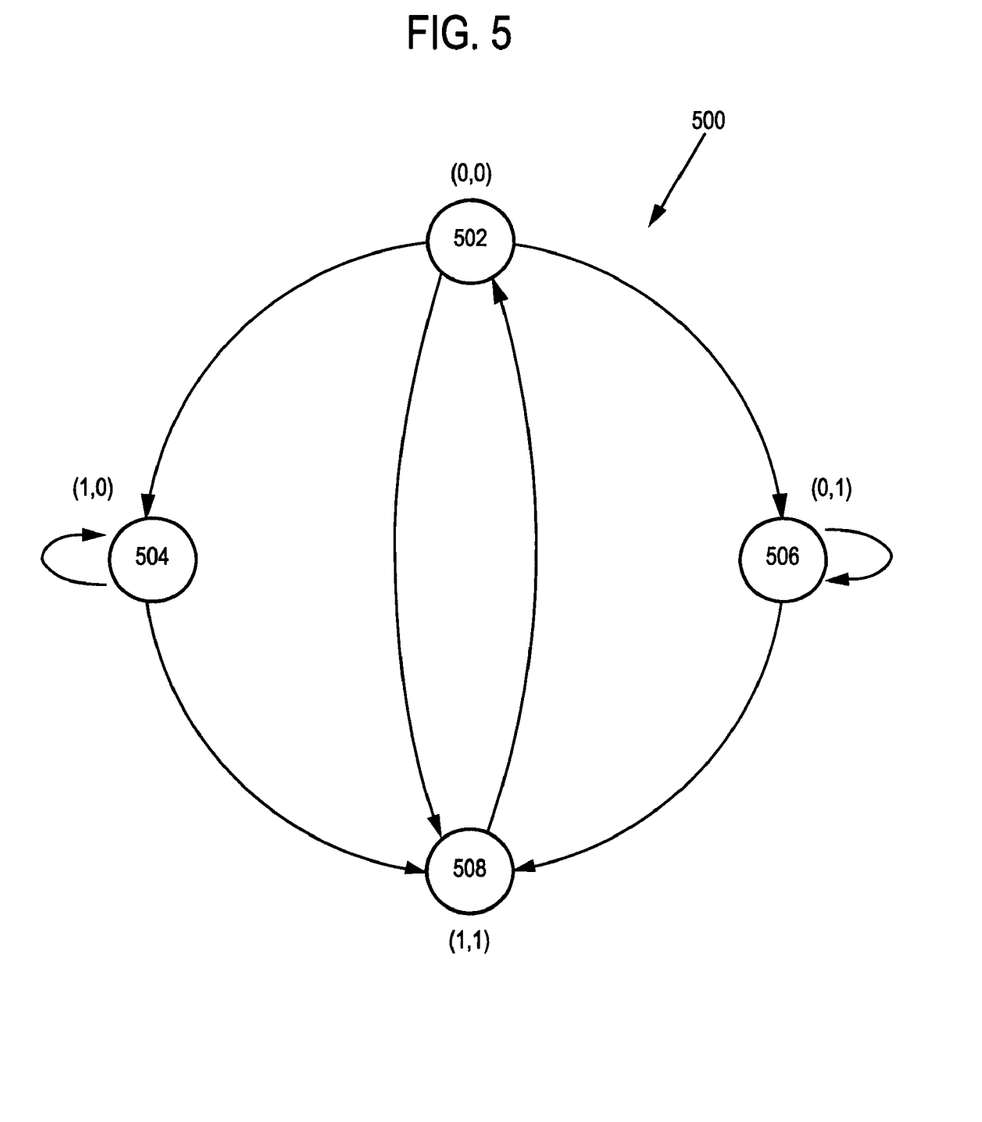
FIG. 5 is an exemplary state machine illustrating Applicants' clock counter.

FIG. 5 presents a state diagram 500 of the counter. As can be seen in FIG. 5, while in the first state, state 502, the counter is rest to a counter value of 0. Referring now to FIGS. 4B and 5, when a first servo element, such as servo element 110, detects a leading edge of a servo burst encoded in a first servo band, such as pulse 410 encoded in servo band 402(2), the counter is started and a transition is made to state 504. The system 500 remains in state 504 until a second servo element, such as servo element 130, detects a leading edge of a servo burst encoded in a second servo band, such as pulse 420 encoded in servo band 402(3), wherein one data band separates the first servo band from the second servo band. When the second servo element detects a leading edge of a servo burst encoded in a second servo band, the system transitions to state 508 and in step 740 the counter is stopped. After a counter value is read, the system returns to state 502.

Similarly, if the second servo element detects the leading edge of a servo burst before the first servo element, the counter is started and a transition is made to state 506. The system remains in state 506 until the first servo element detects the leading edge of a servo band. At this, the system transitions to state 508 and in step 740 the counter is stopped.

If both servo elements detect a leading edge of a servo band at the same time, a transition is made to state 508 and then back to state 502, where the counter value is reset to 0.

Referring again to FIG. 7B, in step 760 the method determines a counter value. In certain embodiments, step 760 is performed by a controller, such as controller 220 disposed in a data storage device, such as data storage apparatus 200. In certain embodiments, step 760 is performed by a processor, such as processor 242, disposed in a host computer, such as host computer 240, where that host computer is in communication with a data storage device. In certain embodiments, step 760 is performed by a prescaler, such as prescaler 616 (FIG. 6).

In step 770, the method, using the counter value of step 760 and the adjusted clock rate of step 730, the method calculates a time interval between starting the counter in step 740 and stopping the counter in step 750. In certain embodiments, step 770 is performed by a controller, such as controller 220 disposed in a data storage device, such as data storage apparatus 200. In certain embodiments, step 770 is performed by a processor, such as processor 242, disposed in a host computer, such as host computer 240, where that host computer is in communication with a data storage device. In certain embodiments, step 770 is performed by a prescaler, such as prescaler 616 (FIG. 6).

In step 780, the method uses the time interval of step 770 and the adjusted velocity of step 720 to calculate an offset between the first servo band and the second servo band. In certain embodiments, step 780 is performed by a controller, such as controller 220 disposed in a data storage device, such as data storage apparatus 200. In certain embodiments, step 780 is performed by a processor, such as processor 242, disposed in a host computer, such as host computer 240, where that host computer is in communication with a data storage device. In certain embodiments, step 780 is performed by a prescaler, such as prescaler 616 (FIG. 6).

In step 790, the method identifies a data band encoded between the first servo band and the second servo band using the offset calculated in step 780. In certain embodiments, step 790 is performed by a controller, such as controller 220 disposed in a data storage device, such as data storage apparatus 200. In certain embodiments, step 790 is performed by a processor, such as processor 242, disposed in a host computer, such as host computer 240, where that host computer is in communication with a data storage device. In certain embodiments, step 790 is performed by a prescaler, such as prescaler 616 (FIG. 6).

In certain embodiments, individual steps recited in FIGS. 7A and 7B may be combined, eliminated, or reordered.

In certain embodiments, instructions, such as instructions 232 (FIG. 2) and/or 246 (FIG. 2)6, are encoded in computer readable medium, such as computer readable medium 230 (FIG. 2) and/or 244 (FIG. 2), wherein those instructions are executed by a processor, such as processor 222 (FIG. 2) and/or 242 (FIG. 2), to perform one or more of the steps 710, 720, 730, 740, 750, 760, 770, 780, and/or 790, recited in FIGS. 7A and 7B.

In yet other embodiments, the invention includes instructions residing in any other computer program product, where those instructions are executed by a computer external to, or internal to, tape data storage apparatus 200 (FIG. 2) to perform one or more of the steps 710, 720, 730, 740, 750, 760, 770, 780, and/or 790, recited in FIGS. 7A and 7B. In either case the instructions may be encoded in a computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, CompactFlash, SmartMedia, and the like.

While the preferred embodiments of the present invention have been illustrated in detail, it should be apparent that modifications and adaptations to those embodiments may occur to one skilled in the art without departing from the scope of the present inventions.

We claim:

1. A method to identify a data band encoded between two servo bands in a sequential information storage medium and moving at a velocity across a read/write head comprising two servo elements and a read/write element, wherein said sequential information storage medium and said read/write head are disposed in a data storage apparatus comprising a counter operating at a clock rate, the method comprising:
   detecting a beginning of said first servo band;
   detecting a beginning of said second servo band;
   measuring said velocity;
   adjusting said clock rate based upon said measured velocity;
   calculating an offset between said first servo band and said second servo band; and
   identifying said data band using said offset.

2. The method of claim 1, wherein the sequential information storage medium comprises a plurality of servo bands and a plurality of data bands encoded therein, wherein the plurality of servo bands are interleaved with the plurality of data bands.

3. The method of claim 2, wherein each of the plurality of servo bands comprises a plurality of servo patterns, each servo patterns comprising a plurality of frames, wherein said offset comprises a distance separating a first servo frame encoded in said first servo band and a first servo frame encoded in said second servo band.

4. The method of claim 3, wherein said calculating step further comprises:
starting said counter when said first servo element detects said first servo frame of said first servo band;
stopping said counter when said second servo element detects said first servo frame of said second servo band;
determining a counter value;
calculating said offset based upon said count value.

5. The method of claim 4, further comprising calculating said offset using said counter value, said clock rate, and said velocity.

6. The method of claim 1, wherein:
data storage apparatus further comprises a prescaler;
said adjusting step is performed by said prescaler.

7. An article of manufacture comprising a computer readable medium comprising computer readable program code disposed therein to identify a data band encoded between two servo bands in a sequential information storage medium and moving at a velocity across a read/write head comprising two servo elements and a read/write element, wherein said sequential information storage medium and said read/write head are disposed in a data storage apparatus comprising a counter operating at a clock rate, the computer readable program code comprising a series of computer readable program steps to effect:
detecting a beginning of said first servo band;
detecting a beginning of said second servo band;
measuring said velocity;
adjusting said clock rate based upon said measured velocity;
calculating an offset between said first servo band and said second servo band; and
identifying said data band using said offset.

8. The article of manufacture of claim 7, wherein the sequential information storage medium comprises a plurality of servo bands and a plurality of data bands encoded therein, wherein the plurality of servo bands are interleaved with the plurality of data bands.

9. The article of manufacture of claim 8, wherein each of the plurality of servo bands comprises a plurality of servo patterns, each servo patterns comprising a plurality of frames, wherein said offset comprises a distance separating a first servo frame encoded in said first servo band and a first servo frame encoded in said second servo band.

10. The article of manufacture of claim 9, wherein said computer readable program code to calculate an offset between said first servo band and said second servo band further comprises a series of computer readable steps to effect:
starting said counter when said first servo element detects said first servo frame of said first servo band;
stopping said counter when said second servo element detects said first servo frame of said second servo band;
determining a counter value;
calculating said offset based upon said counter value.

11. The article of manufacture of claim 10, wherein said measuring further comprises a series of computer readable program steps to effect:
determining said velocity;
calculating said offset using said counter value, said clock rate, and said velocity.

12. The article of manufacture of claim 11, further comprising a prescaler, wherein said adjusting further comprises a series of computer readable program steps to effect adjusting said clock rate based upon said measured velocity using said prescaler.

13. The article of manufacture of claim 7, wherein said article of manufacture comprises said data storage device.

14. The article of manufacture of claim 7, wherein said article of manufacture comprises a host computer in communication with said data storage device.

15. A computer program product encoded in a computer readable medium and useable with a programmable computer processor identify a data band encoded between two servo bands in a sequential information storage medium moving at a velocity across a read/write head comprising two servo elements and a read/write element, wherein said sequential information storage medium and said read/write head are disposed in a data storage apparatus comprising a counter operating at a clock rate, the computer program product comprising:
computer readable program code which causes said programmable processor to detect a beginning of said first servo band;
computer readable program code which causes said programmable processor to calculate an offset between said first servo band and said second servo band;
computer readable program code which causes said programmable processor to identify said data band using said offset.

16. The computer program product of claim 15, wherein the sequential information storage medium comprises a plurality of servo bands and a plurality of data bands encoded therein, wherein the plurality of servo bands are interleaved with the plurality of data bands.

17. The computer program product of claim 16, wherein each of the plurality of servo bands comprises a plurality of servo patterns, each servo patterns comprising a plurality of frames, wherein said offset comprises a distance separating a first servo frame encoded in said first servo band and a first servo frame encoded in said second servo band.

18. The computer program product of claim 17, wherein said computer readable program code calculate an offset between said first servo band and said second servo band further comprising:
computer readable program code which causes said programmable processor to start said counter when said first servo element detects said first servo frame of said first servo band;
computer readable program code which causes said programmable processor to stop said counter when said second servo element detects said first servo frame of said second servo band;

computer readable program code which causes said programmable processor to determine a counter value;

computer readable program code which causes said programmable processor to calculate said offset based upon said counter value.

19. The computer program product of claim 18, further comprising:

computer readable program code which causes said programmable processor to determine said velocity;

computer readable program code which causes said programmable processor to calculate said offset using said counter value, said clock rate, and said velocity.

20. The computer program product of claim 19, wherein said data storage apparatus further comprises a prescaler, wherein said adjusting further comprises a series of computer readable program steps to effect adjusting said clock rate based upon said measured velocity using said prescaler.

* * * * *